AUTOMATIC RADIO TRANSMITTING DEVICES

Filed March 26, 1964 8 Sheets-Sheet 1

BASIC BLOCK DIAGRAM.

Inventors
JOHN R. DAVY, ALLAN McKILLOP, &
ERIC B. BRASH
By Mason, Fenwick & Lawrence
Attorneys

AUTOMATIC RADIO TRANSMITTING DEVICES

Filed March 26, 1964 8 Sheets-Sheet 2

SYSTEM BLOCK DIAGRAM.

Inventors
JOHN R. DAVY, ALLAN McKILLOP, & ERIC B. BRASH
By Mason, Fenwick & Lawrence
Attorneys Inventors
JOHN R. DAVY, ALLAN McKILLOP, &
ERIC B. BRASH
By Mason, Fenwick & Lawrence
Attorneys Inventors
JOHN R. DAVY, ALLAN McKILLOP, &
ERIC B. BRASH
By Mason, Fenwick & Lawrence
Attorneys Inventors
JOHN R. DAVY, ALLAN McKILLOP, &
ERIC B. BRASH
By Mason, Fenwick & Lawrence
Attorneys

AUTOMATIC RADIO TRANSMITTING DEVICES

Filed March 26, 1964 8 Sheets-Sheet 6

Inventors
JOHN R. DAVY, ALLAN McKILLOP, &
ERIC B. BRASH
By
Mason, Fenwick & Lawrence
Attorneys Inventors
JOHN R. DAVY, ALLAN McKILLOP &
ERIC B. BRASH
By Mason, Fenwick & Lawrence
Attorneys Inventors
JOHN R. DAVY,
ALLAN McKILLOP & ERIC B. BRASH
By
Mason, Fenwick & Lawrence
Attorneys United States Patent Office 3,396,238

Patented Aug. 6, 1968

3,396,238

AUTOMATIC RADIO TRANSMITTING DEVICES

John R. Davy, Allan McKillop, and Eric B. Brash, Anniesland, Glasgow, Scotland, assignors to Barr and Stroud Limited, Anniesland, Glasgow, Scotland Filed Mar. 26, 1964, Ser. No. 355,003

Claims priority, application Great Britain, Mar. 26, 1963, 11,841/63

4 Claims. (Cl. 178—26)

ABSTRACT OF THE DISCLOSURE

Radio transmitting apparatus for automatically transmitting a predetermined message, wherein the message is stored in binary form, and is read out and converted to morse code for transmission in morse code form, in a selected time sequence.

This invention is concerned with improvements relating to automatic radio transmitting devices.

Automatic radio transmitting devices have many applications, for example as navigational buoys, and are especially useful in the field of emergency rescue operations on the sea where a device may be used to guide rescue craft to, for example, a life raft or a sunken submarine.

Automatic radio transmitting devices should therefore be compact, sturdy and reliable.

The present invention is a keying device for automatically transmitting a predetermined message and including a control unit for holding the complete message in binary code, a store unit for storing successively individual phrases of the message read out from the control unit, a decoder for receiving successively individual elements of each phrase from the store unit, converting them from binary to morse code and passing them to the output of the device, and a timing unit for controlling the readout from the control and store units in response to signals received from the decoder.

An embodiment of the invention will now be described, by way of example, with reference to the accompanying drawings in which:

FIGS. 3 and 4 show circuits of control counters which together form the control counter 20;

Figures 5, 6:
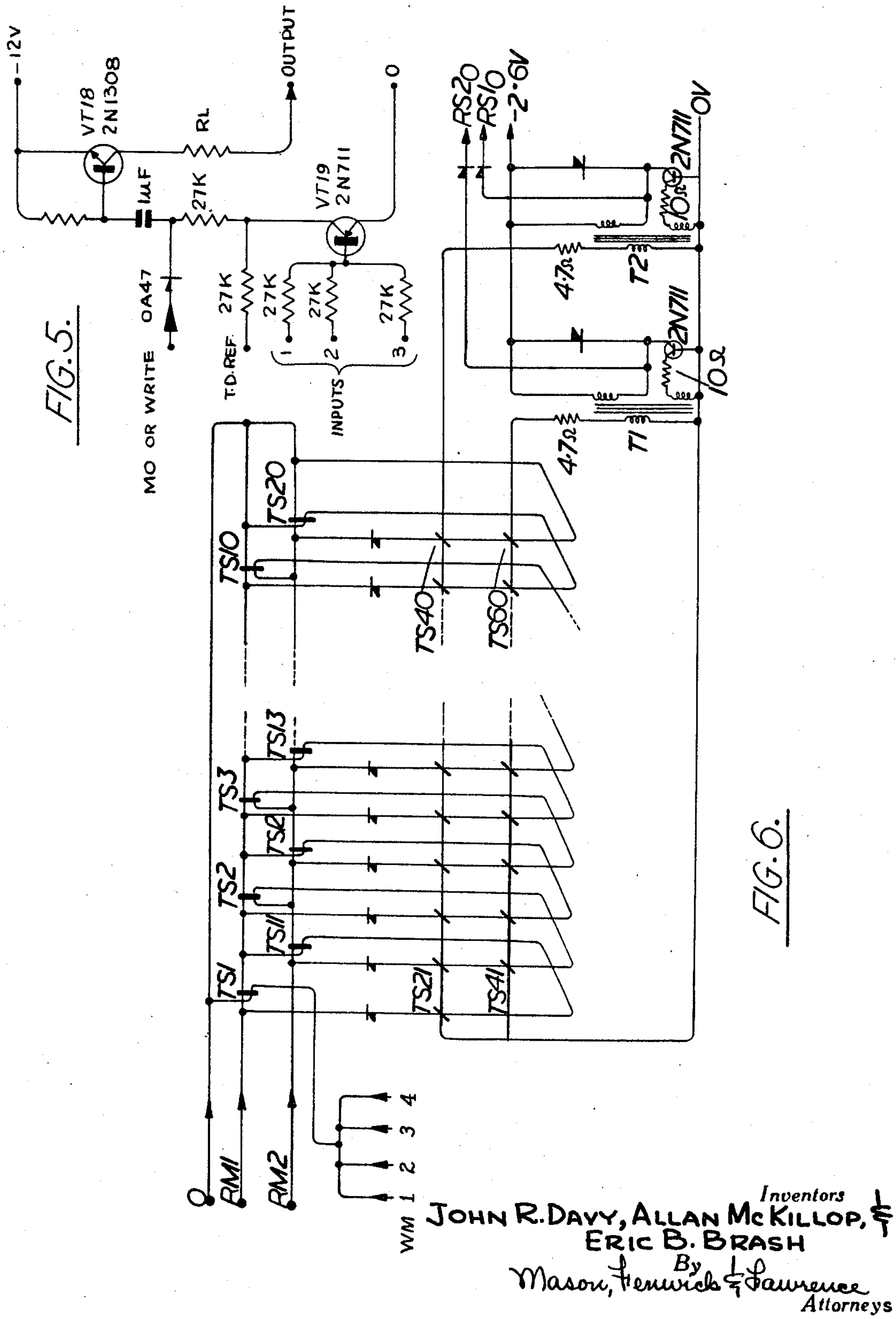
Figure 7:
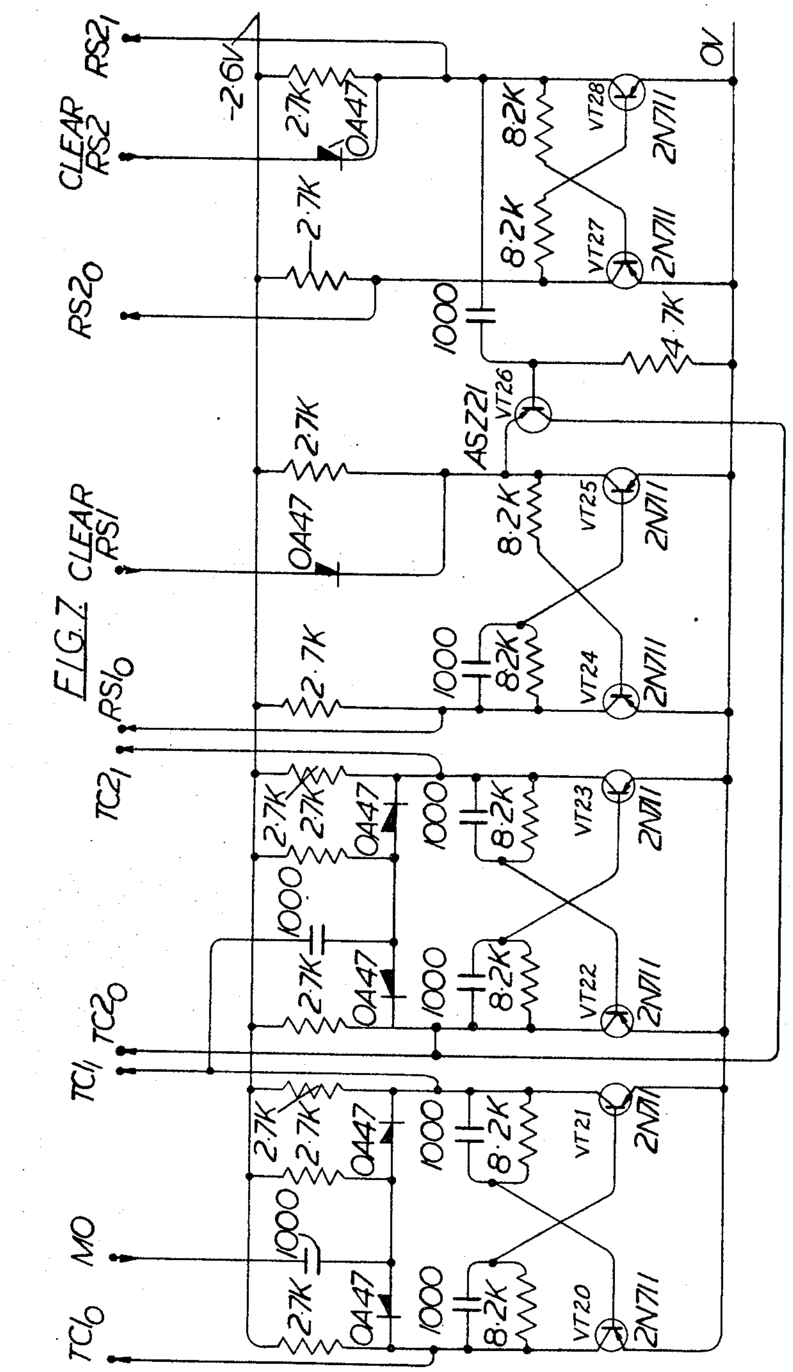
Figure 8:
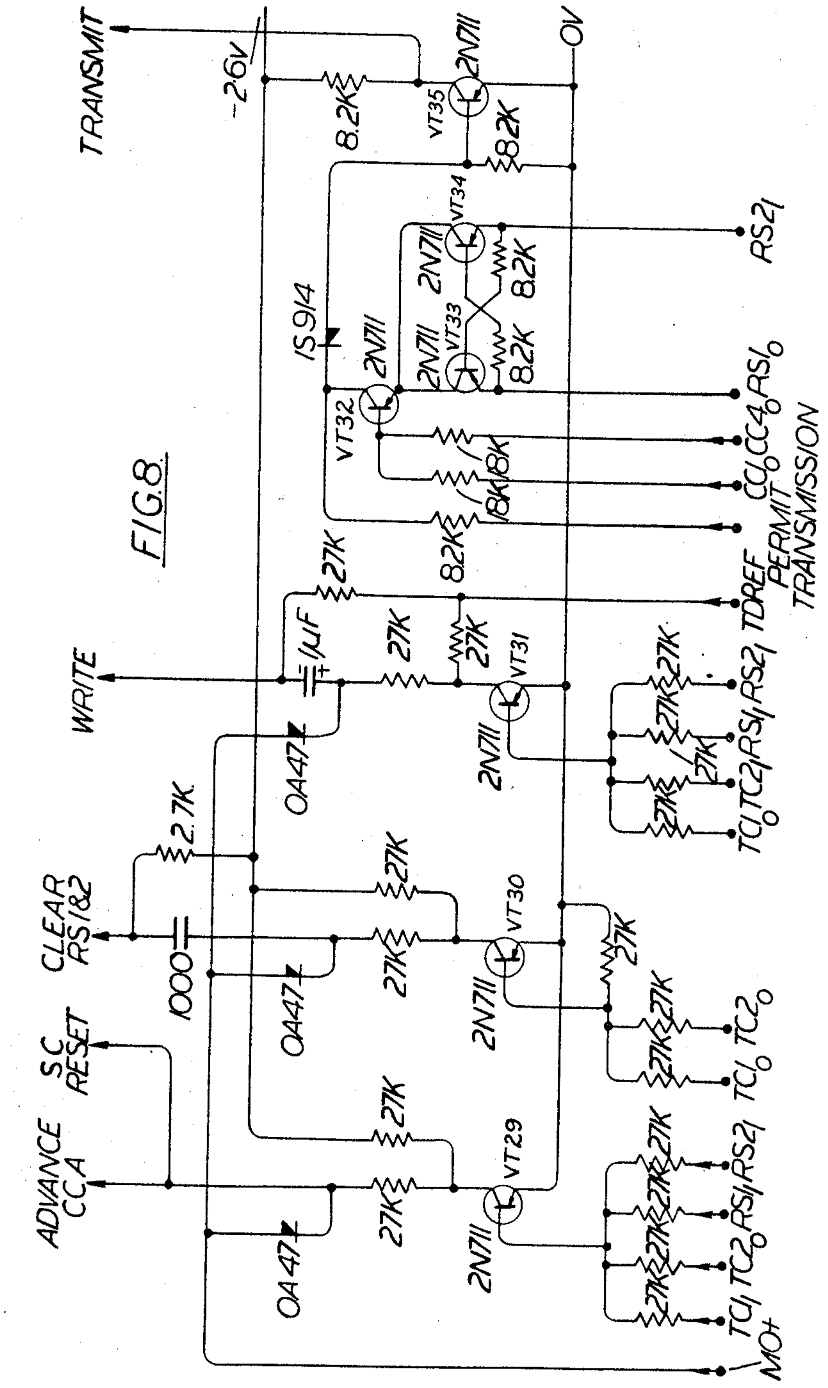
Figure 9:
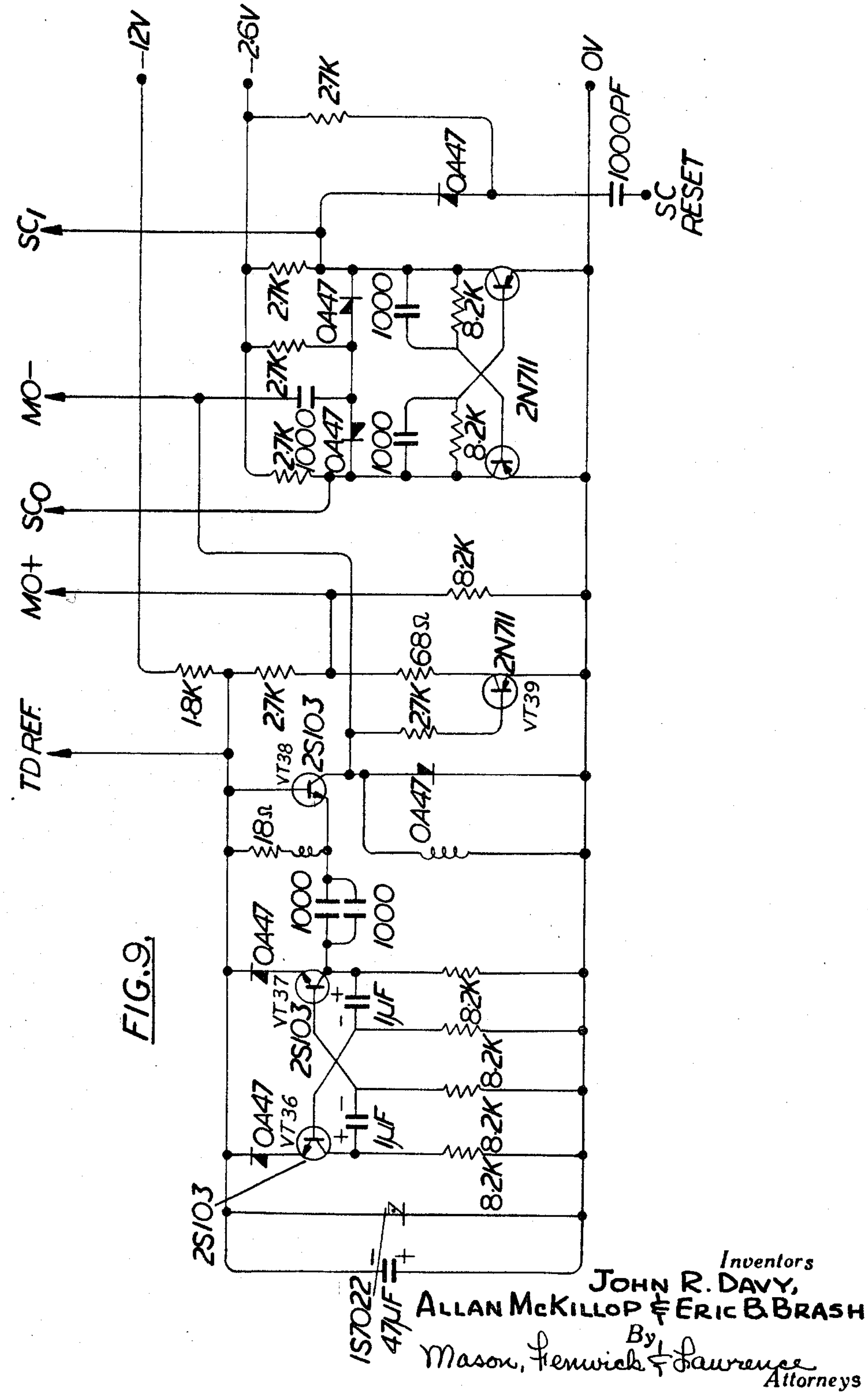

FIG. 5 shows the circuit of a read driver or a write driver, six of these circuit going to make up the control decoder 21, the phrase driver 22, the read drivers 24 and part of the timing logic 25;

FIG. 6 shows the circuit of the store unit 23;

FIG. 7 shows the circuit of the staticisor 28 and timing counter 27;

FIG. 8 shows the circuit of the decoder 26, output logic 29 and output buffer 30, and FIG. 9 shows the circuit of the master wave-form generator 31 and the remained of the timing logic 25.

Figure 1:
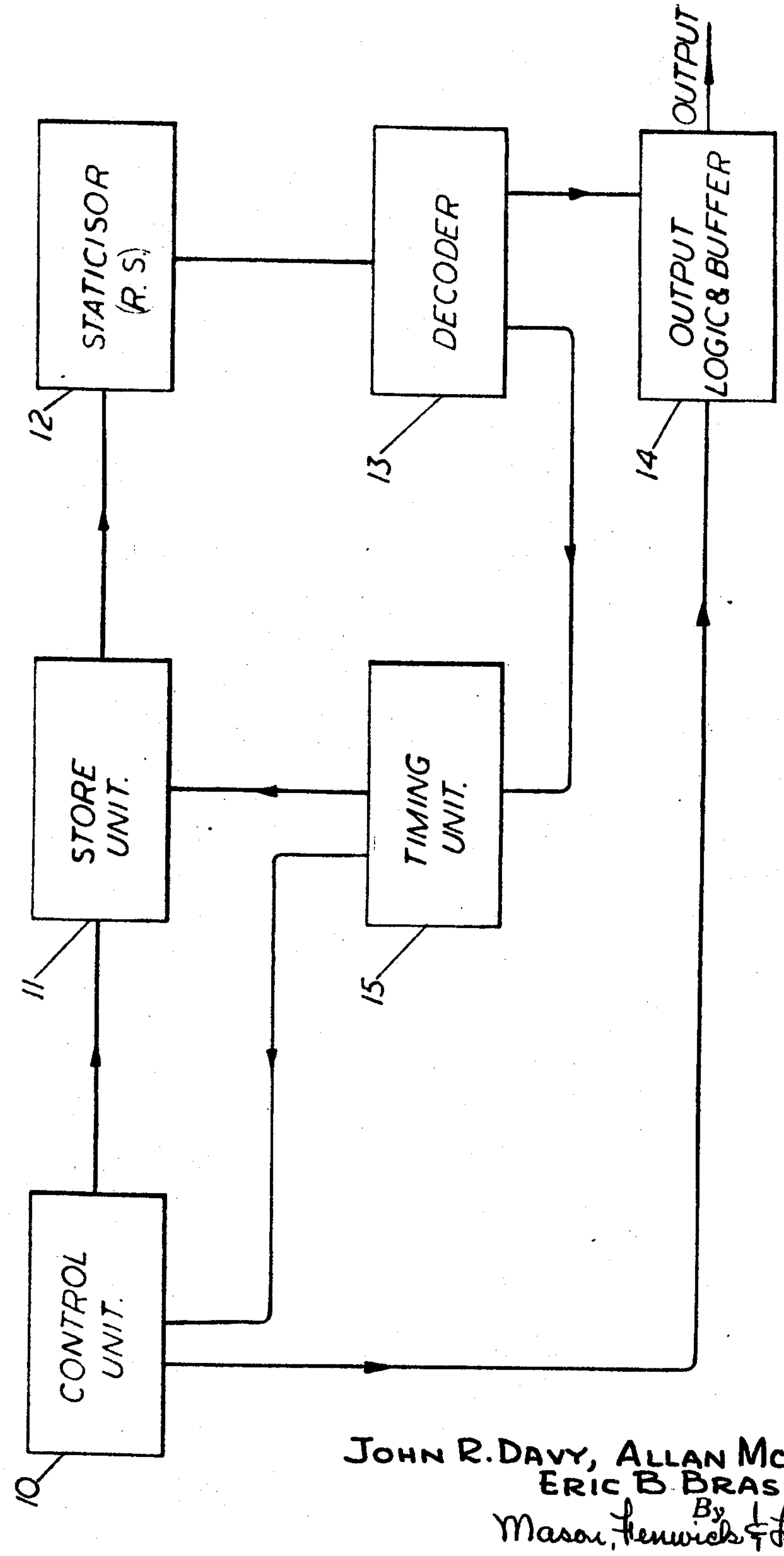
FIG. 1 is a simplified block diagram of an automatic keying device.

Referring now to FIG. 1, an automatic keying device for use with a radio transmitting device consists of control unit 10, a store unit 11, a staticisor 12, a decoder 13 and an output logic and buffer unit 14 connected in cascade to supply an output. The operation of the device is controlled by a timing unit 15 which controls the units 10 and 11 and receives input signals from the decoder

13. Also the control unit 10 is coupled directly to the unit 14.

In this embodiment the device is intended to assist in locating a sunken submarine and the message to be transmitted in cyclic fashion and in morse code is as follows:

(1) An identification number, e.g. "001," to be transmitted three times;

(2) A distress call, "SOS" to be transmitted six times;

(3) A codeword, e.g., "SUBSUNK" to be transmitted three times;

(4) A continuous tone transmission for d.f. purposes.

The transmission cycle is about two minutes and the complete message is to be transmitted twice in four minutes followed by a break in transmission of two minutes. The sequence of two messages followed by a break is automatically repeated.

Although the message is to be transmitted in morse it is stored in and initially handled by the device in binary code. The basic elements of morse code are represented by three out of four possible combinations of two binary numbers, as follows:

DOT having a duration of $t$ secs. 01

DASH having a duration of $3t$ secs. 10

SPACE having a duration of $3t$ secs. 11.

The binary combination 00 is used to represent a special marker as will be described hereinafter.

The complete message is broken down into a number of phrases each containing about fifteen morse elements. This is to permit the store unit 11, which handles the phrases of the message individually, to be as compact and simple as is reasonably practicable.

In operation of the keying device the timing unit 15 first causes the control unit 10 to write a phrase of the message in binary form into the store unit 11. From there each element of the phrase is read out under the control of the timing unit 15 and passed through the staticisor 12 to the decoder 13 where it is converted from binary to morse logic and then passed to the output logic and buffer unit 14. The timing unit 15 controls the readout of the elements of the phrase by causing a second element to be read at a time determined by a signal from the decoder signifying the duration of the first element. Similarly when a phrase in the store 11 has been completely read out a signal is passed from the decoder 13 to the timing unit 15 which causes the control unit 10 to write in the next phrase of the message to the store 11. The unit 14 determines the transmission period for each element in accordance with the signals it receives from the decoder 13, and receives signals direct from the control unit to provide for the continuous tone transmission and the two minute break in transmission.

Figure 2:
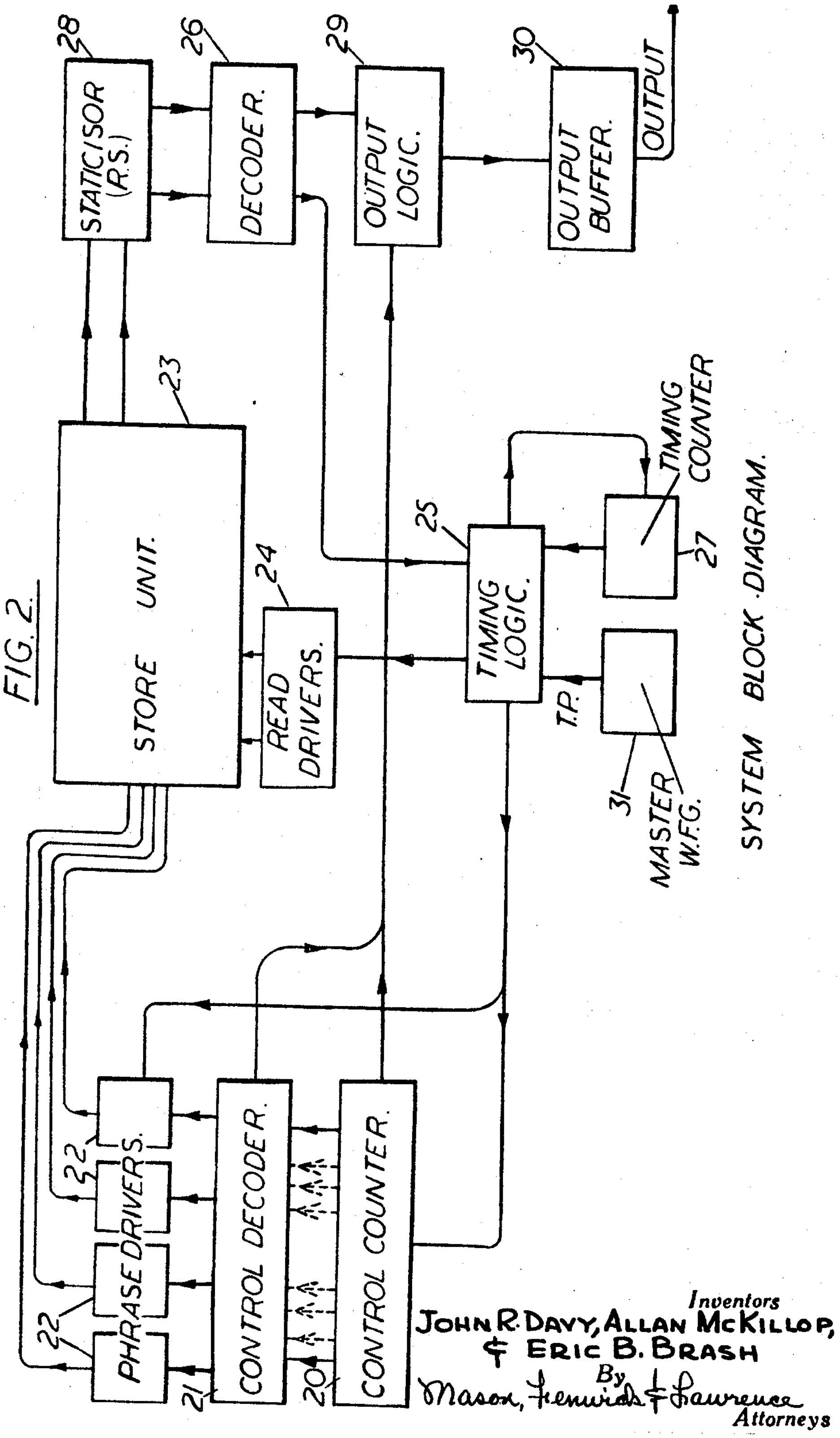
FIG. 2 is a detailed block diagram of the device shown in FIG. 1, the individual block elements being known per se.

FIG. 2 is a more detailed block diagram of the keying device illustrated in FIG. 1. The control unit in FIG. 2 consists of a control counter 20, a control decoder 21 and a bank of four parallel phrase drivers 22 connected in cascade. The store unit consists of a store 23 controlled by a read driver 24. The timing unit consists of a timing logic unit 25 which receives a signal from the decoder 26 and passes signals to the control counter 20, the phrase drivers 22 and the read drivers 24, a master wave form generator 31 which supplies the timing logic unit 25 and a timing counter 27 which is coupled with the timing logic unit 25 and which operates on a basic four count cycle. The staticisor 28 and decoder 26 are the same as in FIG. 1 but the unit 14 of FIG. 1 is split into an output logic unit 29 and an output buffer unit 30, the former receiving signals from the control counter 20 and the control decoder 21.

To follow the operation of the device shown in FIG. 2, assume that the store 23 contains a phrase of the message in its binary form and that the timing counter is in the condition TC=00. The first timing pulse TP1 from the master wave form generator 31, which is operating continuously, because of the condition TC=00, is passed by the timing logic unit 25 to the read driver 24 which reads the binary form of the next element in the store 23 into the staticisor 28.

The fall of each timining pulse is arranged to advance the timing counter 27 by one count, so that immediately after the end of TP1, the staticisor 28 holds an element in binary form and the timing counter has been advanced to 01.

The element held in the staticisor 28 may be a dot, a dash, a letter space or a special marker, and the next part of the sequence depends on which of these elements is held. At all times, the decoder 26 is detecting which element is held in the staticisor 28 and if it detects a dot or a dash, i.e. RS=01 or RS=10, it gives an output signal to the units 29 and 30.

If the element held in the staticisor 28 is a dash, i.e. RS=10, succeeding timing pulses TP2 and TP3 from the master generator 31 advance the timing counter 27 to states 10 and 11.

The condition 11 at the timing counter, together with TP4, is arranged to clear the staticisor 28 ready for the next element from the store 23. The falling edge of TP4 advances the timining counter 27 to 00 and the system is ready to commence a new sequence.

If the element read from the store 23 is a dot, the staticisor 28 is set to the condition RS=01 and this condition is arranged to pass a transient signal to the timing counter to set it to the condition TC=10. The falling edge of TP1 then advances the timing counter to TC=11. TP2 then clears the staticisor and advances the timing counter on its falling edge to TC=00, i.e. the system is ready for a new sequence.

If the element read from the store is a letter space, i.e. RS=11, the timing cycle is identical to that obtained for a dash.

If the element read from the store 23 is a special marker, i.e. RS=00, TP2 is arranged to advance the control counter 20 by one count, and TP3 is arranged to cause a new phrase of the message to be written into the store 23 by the control decoder 21 and the phrase drivers 22. The remainder of this sequence is as for a dash or letter space, except that the clearance of the staticisor is not strictly necessary.

The above-described operation of the device may be expressed in tabular form as follows:

| TP | TC | Operation |
|---|---|---|
| 1 | 00 | Read from store. If RS 01 advance TC to 10. Falling edge advances TC to 01. |
| 2 | 01 | Advance control counter if RS=00. Falling edge advances TC to 10. |
| 3 | 10 | Write new message phrase into store if RS=00. Falling edge advances TC to 11. |
| 4 | 11 | Clear RS. Falling edge advances TC to 00. |
| | | 2-pulse cycle "dot" operation |
| 1 | 00 | Read from store. "Dot" gives RS 01. |
| | 10 | TC is advanced to 10 near the beginning of TP1. Falling edge of TP advances TC again to 11. |
| 2 | 11 | Clear RS. Falling edge of TP2 advances TB to 00. |

Thus logic operations are normally carried out during the timing pulse TP and the counter is advanced by its falling edge. When a "dot" is read from the store the basic four pulse cycle of the timing unit is shortened to a two pulse cycle.

A typical operating sequence of the device might therefore be as follows:

| WFG | TP | TC | Operation | RS | Output |
|---|---|---|---|---|---|
| 1 | 1 | 00 | Read dash | 10 | |
| 2 | 2 | 01 | - | 10 | |
| 3 | 3 | 10 | - | 10 | |
| 4 | 4 | 11 | Clear RS | 00 | |
| 5 | 1 | 00 | Read dot | 01 | |
| 6 | 2 | 11 | Clear RS | 00 | |
| 7 | 1 | 00 | Read letter space | 00 | |
| 8 | 2 | 01 | - | 00 | |
| 9 | 3 | 10 | - | 00 | |
| 10 | 4 | 11 | Clear RS | 00 | |
| 11 | 1 | 00 | Read dot | 01 | |
| 12 | 2 | 11 | Clear RS | 00 | |
| 13 | 1 | 00 | Read dot | 01 | |
| 14 | 2 | 11 | Clear RS | 00 | |
| 15 | 1 | 00 | Read dash | 10 | |
| 16 | 2 | 01 | - | 10 | |
| 17 | 3 | 10 | - | 10 | |
| 18 | 4 | 11 | Clear RS | 00 | |

The circuit elements are completely standard and numerous circuits already known in the art could be used, for example:

*Store unit*

The practical forms of this element may be divided roughly into two classes, viz:

(a) A unit consisting of two shift registers, arranged so that the desired phrases of the message may be written into them in binary code in a parallel mode by a prewired input system, which may be permanently wired or alterable by means of prewired plugs or cam switches, and from which the binary coded phrases may be read sequentially by a series of shift pulses.

Known methods of constructing such an arrangement include registers using semiconductor devices, magnetic cores (single or multi-aperture) or combinations of cores and semiconductors.

(b) A unit using a form of matrix store similar to devices known in digital computer engineering for the storage of permanent or semi-permanent orders, the read out from the matrix being controlled by a counter. Known forms include:

(1) A magnetic core matrix, prewired to write in the desired phrases.

(2) A magnetic core matrix, the desired binary coded message being inserted by the use of permanent magnets to bias selected cores.

(3) Forms of matrix where binary information is represented by mutual inductance between conductor loops, the desired binary coded message being inserted by using slugs of magnetic material or areas of conductive material to control the mutual inductance between the loops of the matrix.

Minor modifications to the circuit shown in FIG. 2 might be necessary to accommodate the stores described above, e.g. the message phrase might be selected by the control unit at the output of the store rather than through phrase drivers at the input.

*Control counter and decoder*

These units may be constructed using known circuits employing semiconductor devices or forms of magnetic core counter. Decoding is by transistor, diode or resistor logic or by magnetic core logic if a magnetic core counter is employed.

*Phrase drivers*

These are essentially power amplifying stages and known semiconductor or magnetic core techniques may be applied depending on the form of store used.

The remaining circuit elements of FIG. 2 are well known in computer engineering and known semiconductor circuits may be used.

The output buffer unit may, however, be omitted in many practical devices as its only function is to amplify the output signal.

Also as the function of the staticisor is merely to convert the momentary pulse signal from the store into a more lengthy signal which can be utilised by the decoder, it may be omitted if the signal read out from the store is already in a useful form.

Figure 3:
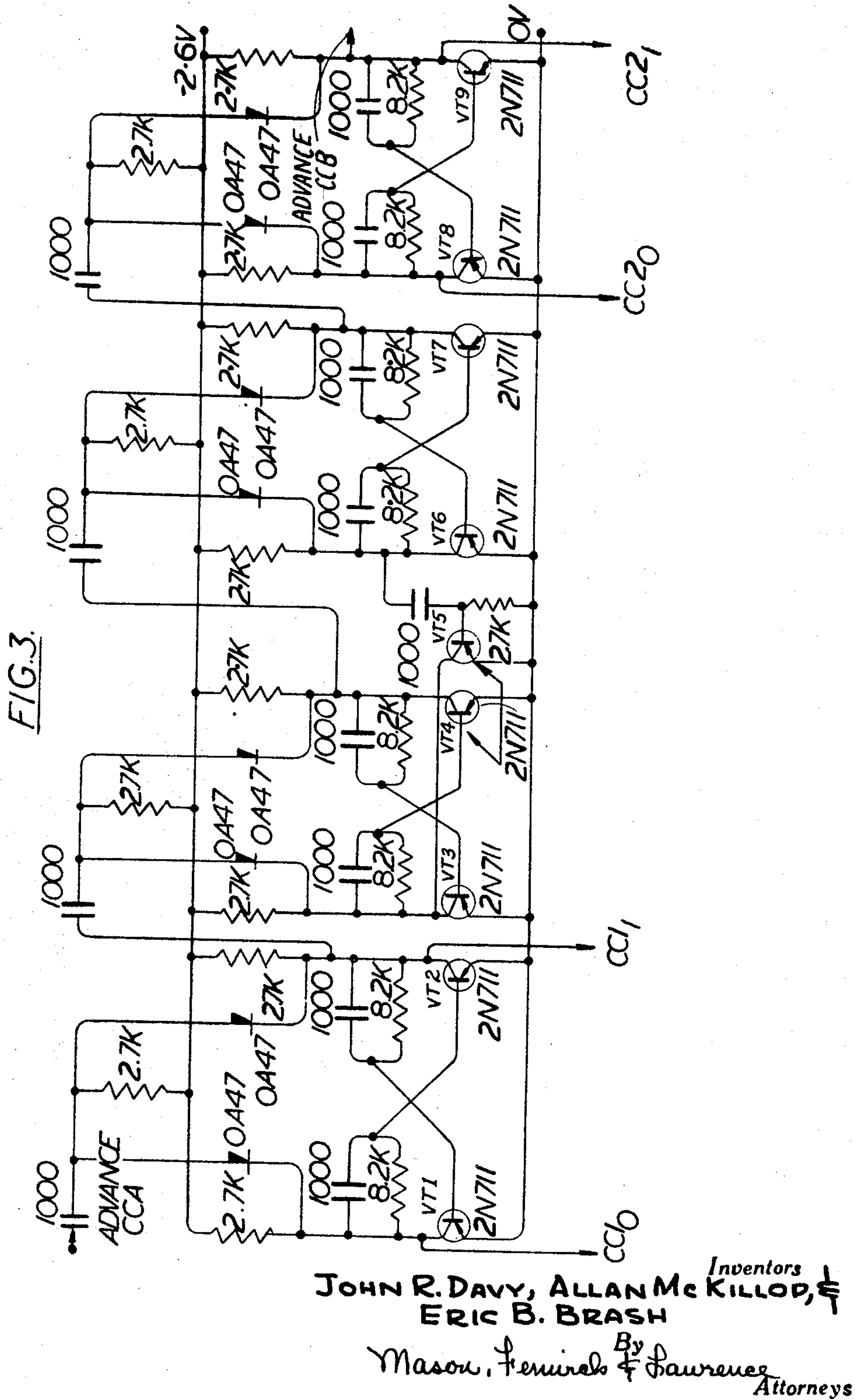
FIGS. 3 to 9 are detailed circuit diagrams, given only by way of example, of elements of FIG. 2, as follows.
Figure 4:
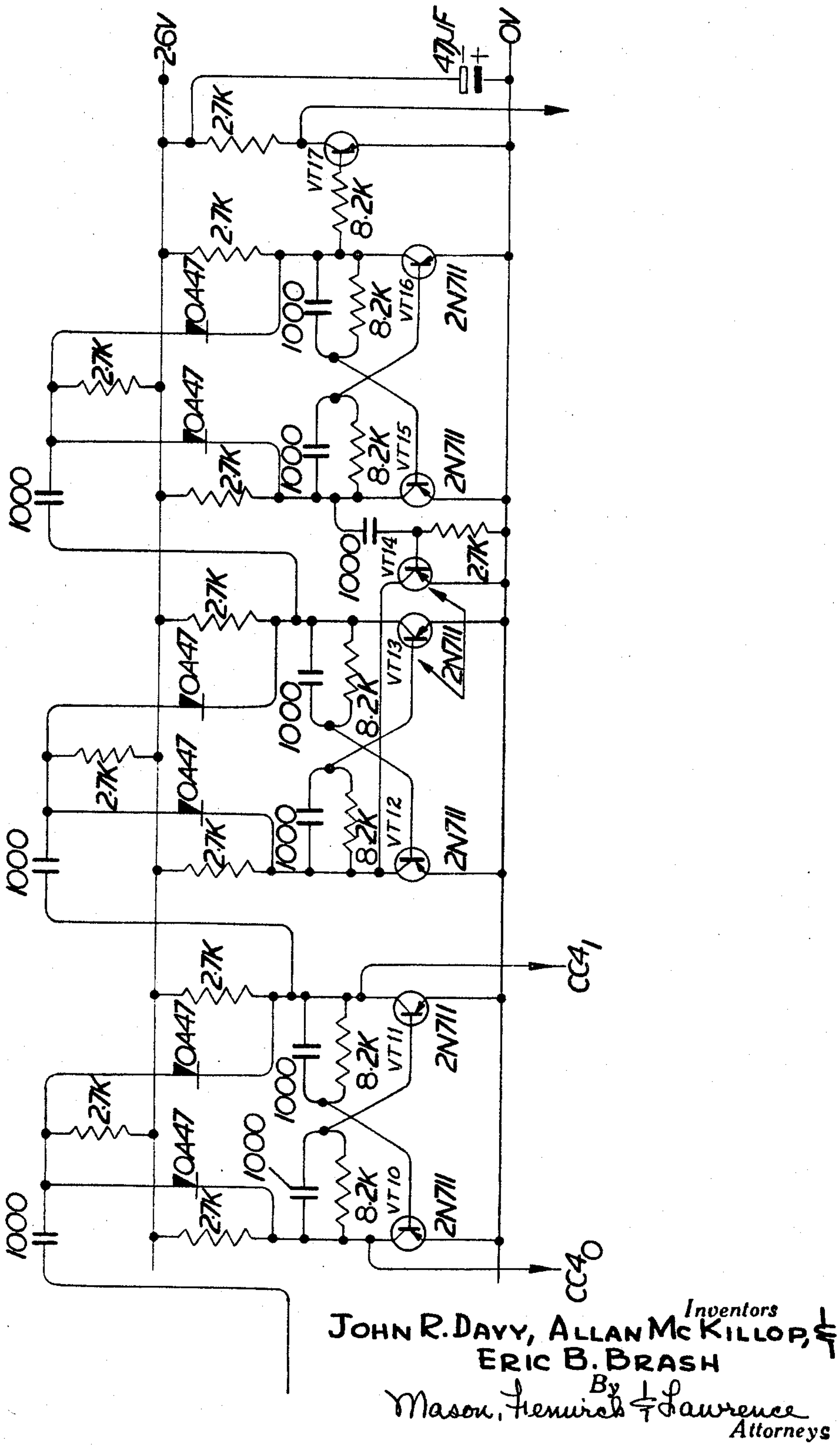

Referring now to the detailed circuit diagrams, FIGS. 3 and 4 show the control counter 20 which is composed of seven conventional bistable circuits in series. Each bistable circuit is constructed with two transistors of which the first pair are VT1 and VT2. The circuit is so arranged that when in a state of rest one transistor is conducting and the other is not. The arrival of a waveform with a positive edge at "Advance CCA" forces the transistors VT1 and VT2 to change to their opposite states by means of accumulative action around the circuit.

A step is produced at $CC1_0$ of opposite polarity to that at $CC1_1$. The arrival of a second positive step at CCA reverses this change so that the bistable is back in its original state. Therefore, for one complete cyclic change of the bistable, VT1 and VT2, two cycles of a rectangular waveform are required at the input CCA, thus making the bistable a "Divide by two" or "Count by two" circuit.

VT3/4 and VT6/7 form two more bistable circuits which have feedback between them provided by VT5. The effect of the feedback is to give one cyclic change at the collector of VT7 for every three positive steps supplied by VT2 ($CC1_1$).

In other words, VT3–VT7 forms a "Divide by three" stage.

In a similar manner VT8/9 and VT10/11 are "Divide by two" stages and VT12–VT16 forms another "Divide by three" stage.

The overall result therefore is that the collector of VT16 generates one cycle of a rectangular waveform for every 72 cycles at "Advance CCA." VT17 acts as a buffer amplifier for the final output.

In FIG. 5 are shown the control decoder 21 and phrase drivers 22. In the latter the transistor VT18 corresponds to one of four phrase drivers whose outputs via their load resistors $R_L$ enter the store unit at WM1 to WM4.

In the rest condition VT18 is not conducting as the base is returned to −12 v. Now providing VT19 is not conducting a positive pulse applied to the anode of the diode will cause VT18 to conduct and generate a pulse of current through $R_L$.

If, however, any one or all of the inputs (1, 2, 3) are at a negative potential VT19 will be conducting and so the cathode of the diode will be at zero volts thus preventing any pulse from driving VT18.

The input resistors together with VT19 form one of four NAND gates (i.e., an AND gate, the output signal of which is negative, although the input signal thereto is positive) which in turn represent the control decoder (21). The outputs CC1 and CC5 of the control counter are connected to the four NAND gates so that only the appropriate phrase driver operates when required.

In the case of the four phrase drivers, the pulse applied to the diode is only generated when a new phrase is required to be written into the store unit.

Except for the value of $R_L$, the read drivers, of which there are two, are identical to the phrase drivers. However, this time the NAND gates form part of the timing logic (25) while the pulse applied to the diode is generated directly by the master oscillator, or W.F.G. (31).

The store unit 23 is shown in FIG. 6.

Transformers TS1 to TS60 are constructed from toroidal ferrite switching cores which are characterized by their approximately rectangular hysteresis loop with its two well defined remanent states of magnetization. These two states are used to represent the binary digits "0" and "1." TS21 to TS60 compose the storage section which consists of two rows of 20 cores with each row having a readout wire terminating at the primary of a blocking oscillator transformer. The blocking oscillators generate positive going pulses which are passed through diodes to $RS1_0$ and $RS2_0$.

The storage cores are read in pairs from left to right with each pair representing a morse code element. To do this a pulse of current is passed through each pair in turn, the first pair being TS21/41, the second TS22/42, etc.

If initially TS21 is left in the "0" state and TS22 is set to the "1" state, the outputs of T2 and T1, when read, can be represented by "0" and "1" respectively. By varying the initial states of the storage cores, four possible combinations are obtainable at T1 and T2 each time a pair of cores is read. These combinations have been designated as follows:

| Output T2 | Output T1 | Title |
|---|---|---|
| 0 | 1 | DOT |
| 1 | 0 | DASH |
| 1 | 1 | SPACE |
| 0 | 0 | REWRITE |

Thus when there is an output pulse at T1 only, the device has been designed to produce a morse code dot at the final output. When there is an output at T2 only, a dash is produced and an output pulse at both T2 and T1 produces a space. The absence of a pulse at both T2 and T1 indicates that the cores TS21 to 60 require resetting, i.e. a new phrase needs to be written.

Transformers TS1–20 compose the commutator section of the store unit and form part of the readout mechanism associated with the storage cores. When a new phrase is written into the store, the write pulse, derived from the corresponding phrase driver, enters the store on one of the inputs WM1–4. After passing through the appropriate cores in the storage section, the pulse passes through TS1 in such a manner that it sets TS1 to the "1" state.

In order to read the phrase, pulses are derived alternately from the read drivers. The first pulse enters at RM1 and causes the "1" in TS1 to be shifted to TS11. The pulse of current that sets TS11 also passes through TS21/22 sending the previously set code out to T2 and T1. The reset pulse enters at RM2 transferring the "1" in TS11 to TS2 and at the same time passes the second bit of information out to T2 and T1. This sequence of events is repeated until a pair of the storage cores are located which are both in the "0" state.

The staticisor 28, shown in FIG. 7, is composed of two bistable circuits, VT24/25 and VT27/28 linked together by VT26. The purpose of the staticisor is to convert the short pulses representing the binary code, derived from T2 and T1 in the store unit, into a rectangular waveform that can be decoded, to represent the morse code, at the output.

The pulses from T2 and T1 in the store unit enter the staticisor on $RS1_0$ and $RS2_0$, respectively. The two bistable circuits operate in a similar fashion to the ones in the control counter. On application of a positive waveform to "clear RS1" and "RS2," VT25 and VT28 are in the fully conducting condition. By application of the pulses from T2 and T1, in the store unit, to $RS1_0$ and $RS2_0$, respectively, the relevant bistable can be made to change its state.

Transistor VT26 is normally in a non-conducting condition which is retained provided the code "10," "00" or "11" enters $RS1_0$ and $RS2_0$. If, however, the condition "01" enters the staticisor, the normal sequence of events has to be shortened, as a "dot" lasts for half the time of the other elements. In this case VT26 is brought into conduction and its collector passes a positive pulse along to the timing counter at $TC2_0$.

The timing counter 27, shown in FIG. 7, consists of a further two bistable circuits VT20/21 and VT22/23 connected in series, normally dividing the output from the free running master oscillator by four.

When the read driver operates $TC1_1$ and $TC2_1$ are at zero volts as VT21 and VT23 are conducting. Thus $TC1_0$ and $TC2_0$ are in the condition "00," and while the store specifies a "dash," "a space" or a new phrase from this read pulse, $TC2_1/TC1_0$ follow the sequence "00," "01," "10," "11." If, however, the code for a dot is generated, VT26 sends a positive pulse from the staticisor and so returns VT22 into a conducting state. Thus the sequence for $TC1_0$ and $TC2_0$ becomes shortened to "00" "11."

The decoder 26 of FIG. 8 consists of three NAND gates (VT29, VT30 and VT31). VT29 forms the gate to advance CCA and operates when $TC1_1$, $TC2_0$, $RS1_1$ and $RS2_1$ are all in the "1" state. This only occurs when the signal "00" is received from the store, in answer to a read pulse.

In a similar manner a pulse is derived to return $RS1_1$ and $RS2_1$ back to the "1" state after each morse code element by detecting with VT30 when $TC1_0$ and $TC2_0$ are in the "1" state. In a similar manner to the advance CCA gate, the write gate detects when no signal has been returned from the store in answer to a read pulse and operates the write gate so that a new phrase is inserted into the store.

The output logic and buffer circuits 29 and 30 are shown in FIG. 8. VT33 and VT34 form an exclusive OR gate and provided either one or the other, but not both of $RS2_1$ or $RS1_0$ is positive current can flow through their common collector load. This load consists of a NAND gate VT32 which derives its inputs from the control counter and a resistor which is controlled by VT17 on the control counter.

The output transistor V35 is normally in the "0" state and requires a negative input on the base to give a positive waveform at its collector. If VT17 on the control counter is conducting, V35 will remain in the "0" state. However, if VT17 is off, then an output signal can be obtained either by both $RS2_1$ and $RS1_0$ being in the "0" or "1" state or $CC1_0$ and $CC4_0$ being in the "1" state. The positive output obtained from VT32 takes precedence over any waveform generated by VT33 and VT34.

We claim:

1. A keying device for automatically transmitting a predetermined message and including a control unit having stored therein a preselected complete morse code message in binary code form, a store unit coupled to said control unit for holding successively individual phrases of the message read out from the control unit, a decoder for receiving successively individual elements of each phrase from the store unit, converting them from binary to morse code and passing them to the output of the device, and a timing unit for controlling the readout from the control and store units in response to signals received from the decoder.

2. A keying device as claimed in claim 1, including an output logic unit for receiving signals from the decoder and the control unit to control the signal at the output.

3. A keying device as claimed in claim 2, in which the timing unit includes a master wave form generator and a timing counter which operates on a four pulse cycle.

4. A keying device as claimed in claim 3, in which the relation between the morse and binary codes is:

| | |
|---|---|
| DOT | 01 |
| DASH | 10 |
| SPACE | 11 |

References Cited

UNITED STATES PATENTS 2,996,577 8/1961 Smith-Vaniz -------- 178—26.5
3,196,210 7/1965 Murray ------------- 178—26

THOMAS A. ROBINSON, *Primary Examiner.*